W. H. Horstmann.
Telegraph Cable.
No. 1,343.
Reissued Sept. 9, 1862.
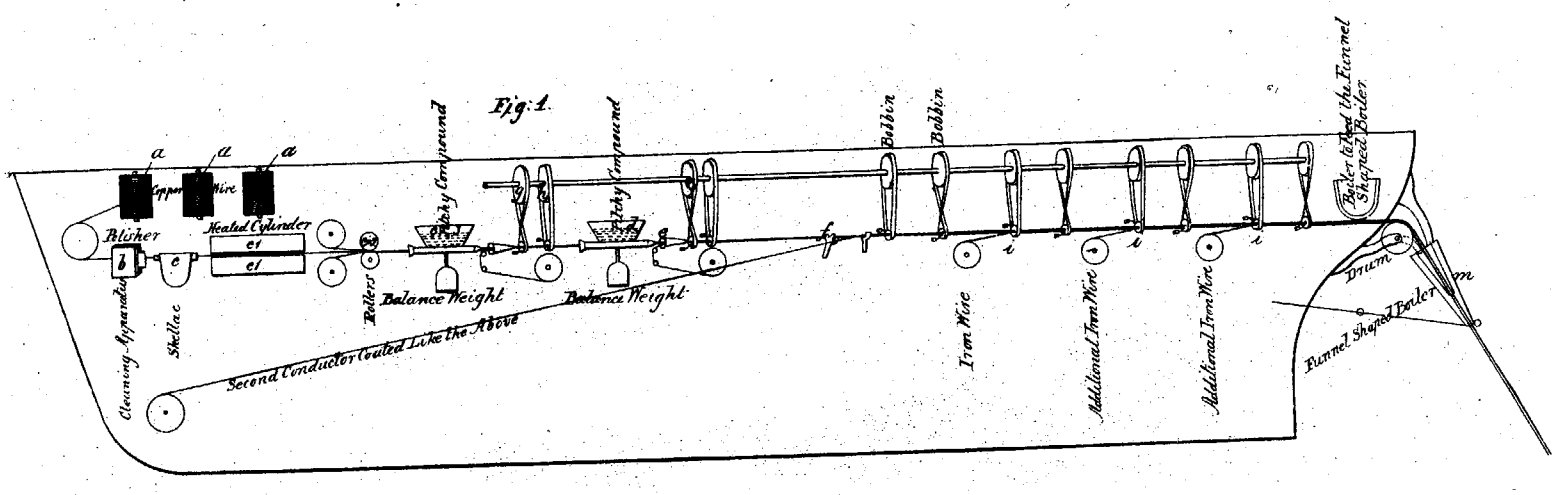
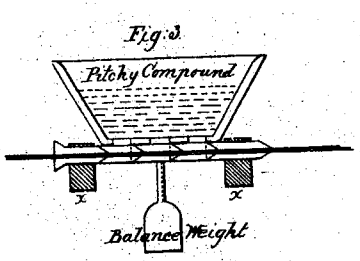
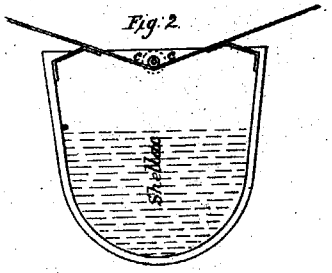

UNITED STATES PATENT OFFICE.

WILLIAM H. HORSTMANN, OF BROOKLYN, NEW YORK.

IMPROVEMENT IN SUBMARINE CABLES FOR TELEGRAPHS.

Specification forming part of Letters Patent No. 25,414, dated September 13, 1859; Reissue No. 1,343, dated September 9, 1862.

DIVISION No. 2.

*To all whom it may concern:*

Be it known that I, WILLIAM H. HORSTMANN, of Brooklyn, in the county of Kings and State of New York, have invented certain new and useful Improvements in the Construction of Cables for Telegraphic Purposes; and I do hereby declare and ascertain the said inventions, referring to the accompanying drawings, in which—

Figure 1 is a general outline of the arrangement and disposition of the apparatus on board a ship when the cable is to be submerged. Fig. 2 is a vertical section of a reservoir enlarged.

My improvement in this portion of my invention consists of a mode of making and laying the cable, and is as follows:

A wire, of copper or other good conductor of electricity, wound on a spool, or reeled or coiled conveniently, as shown in the drawings at *a a*, is placed in any convenient position, from whence the end of the wire passes through a proper scouring apparatus, such as sand-paper or other material, and thence through leather polishers, as at *b*, by which all oxide on the surface is removed. The bright metallic wire thus cleaned is drawn along a line at the junction of two inclined planes, as at *c*, (see Fig. 2,) down which a quantity of dissolved gum-lac is caused to flow, by which the wire receives a perfect coating. After passing this coating apparatus the wire is drawn through a heated cylinder or oven, *c'*, which equalizes the coating somewhat, and thence the wire runs between two rollers at $c^2$, where a covering of cloth is applied to it, or other fibrous covering. The material, being wrapped around the wire by grooves in the rollers, adheres to the coating thereon. From thence I convey the wire through an apparatus at $c^3$, containing gum-lac dissolved in a pure state or mixed with turpentine or other resinous materials that will serve to make it more elastic.

Many forms of apparatus may be used, and the precise mode of procedure herein described be varied without changing the principle of my invention. The construction which I propose as the best for the reservoirs for gum-lac, pitch, or rosin composition, is as follows:

I form a reservoir or kettle, (see Fig. 3,) which, if it is to be heated, is made double and heated by steam, as in other double-cased steam-heaters. This reservoir is hung on trunnions or lugs *x*, (see Fig. 3,) through which the steam enters, so as not to be tipped or canted by the rolling of the vessel. At the axis of this reservoir the wire above named is made to pass through a casing surmounted by a double-inclined plane, table, or hopper, which feeds the coating material to the wire as it passes through the hopper, being supplied from the reservoir. The wire then runs through an apparatus at *d* filled with rosin mixed with sufficient tar to make it pliable, or with a similar compound of the resinous gums. This is preceded by a coating of muslin, tape, paper, or other fibrous material, or gutta-percha, or india-rubber, and it is then passed through a wrapping-guide apparatus, as seen at *e*, which is a conical tube that wraps the material around the wire.

The operation of wrapping may be completed by a spring-fork, *f*, that embraces it. A second coating of the resinous compound and another tape may then be added, or more, if found advisable. Then the conductor, thus insulated, may be joined to another, similarly formed and coated, and the two bound together by a yarn wound from a bobbin or spool around them in a manner well known and used for covering bonnet-wire and such like articles. This is done at *g*, and at *h* a second yarn may be laid in the opposite direction, crossing the first. I give no particular description of this apparatus for covering wire as there are many varieties well known. The conductor or conductors thus insulated has one or more stout iron wires joined with it, laid along outside the insulating material and firmly bound to it by any convenient wrapping which will properly unite them into one cord, as at *iii*. The last-named wire or wires are intended to bear the strain of the cable while being laid, running straight along the exterior surface of the insulator that surrounds the conductor instead of passing spirally around it, as all protectors heretofore made have done.

The cable thus formed is conveyed overboard either at the stern of the vessel, as shown in the drawings, or at the side or other most suitable point of delivery.

In passing overboard the cable should enter a kettle of melted tar and rosin compound at

*m*, down through the bottom of which it passes, as clearly shown in the figure. An elastic-mouthed opening at that point prevents any more of the compound escaping than is sufficient to properly coat the cable as it descends thence into the water.

The opening above named at *m* is governed by a rope, *o*, by which the opening can be contracted or expanded. The kettle is double and heated by steam.

By making the cable as it is laid I avoid all injury from handling.

Having thus fully described my improvements, what I claim and desire to secure in this portion of my patent reissued, is—

1. Forming the cable herein described by the apparatus, substantially as herein set forth, consisting of coating reservoirs and wrapping apparatus, &c., or their equivalents.

2. The final reservoir *m*, for coating a telegraph-cable just before it enters the water or ground, substantially as and for the purposes described.

3. Manufacturing the cable at the time it is laid, when found advantageous so to do, as above specified.

WILLIAM H. HORSTMANN.

Witnesses:

HENRY C. DART,

J. J. GREENOUGH.